Patented Mar. 20, 1945

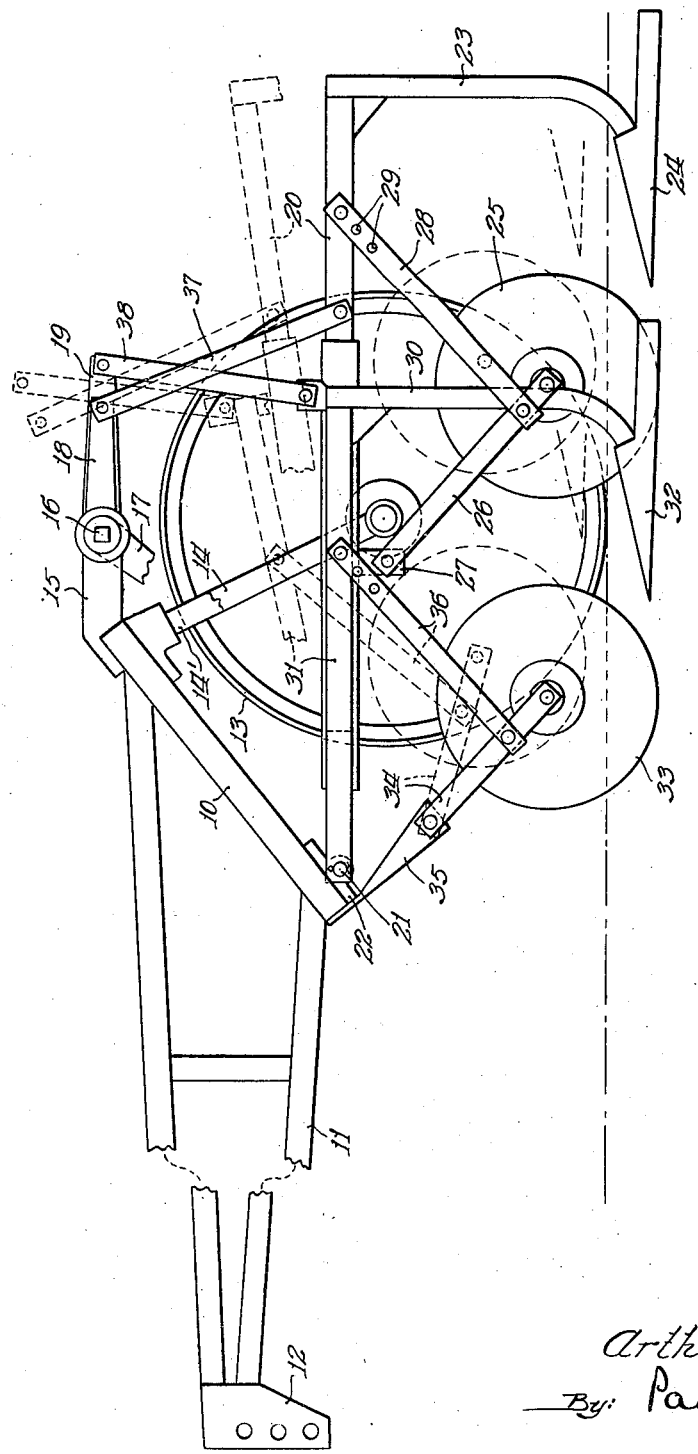

2,371,924

UNITED STATES PATENT OFFICE 2,371,924

CULTIVATING IMPLEMENT

Arthur A. Scarlett, Hamilton, Ontario, Canada, assignor, by mesne assignments, to International Harvester Company, Chicago, Ill., a corporation of New Jersey Application December 13, 1943, Serial No. 514,002

7 Claims. (Cl. 97—86)

The present invention relates to cultivating implements. More specifically, it relates to a field cultivator and to means for lifting the same and associated coulters out of working position. In the use of field cultivators, a plurality of staggered earth-working elements or tools in the form of sweeps is usually employed. In order to provide working space and to completely cover the ground, one set of shovels or sweeps is usually placed a substantial distance rearwardly of the other set, the sweeps being arranged in staggered relation. Where the sweeps are carried by means pivoted on a common axis, such as, for example, shown in the Scarlett Patent 2,286,312, June 16, 1942, it is obvious that the forwardly located sweeps will be mounted on beams much shorter than the rearwardly located sweeps. If the beams are all lifted by a common lifting shaft with lifting arms and lifting links of the same length attached to the beams at the same locations, the forward shovels are not raised to the same height as the rear shovels. It is, therefore, necessary to have an extremely long lifting range to clear all the shovels sufficient for transporting the machine.

The principal object of the present invention is to provide an improved lifting linkage for the beams of a field cultivator.

Another principal object is to provide a lifting linkage for forwardly carried rolling coulters in order to lift the coulters clear of the ground for transporting the implement.

These and other objects will be apparent after a consideration of the detailed description of the invention taken in conjunction with the accompanying drawing.

In the drawing, the single figure is an end view of a field cultivator embodying the invention, with one wheel removed to better show the features of the invention.

Referring to the drawing, the cultivator consists of an inclined frame structure 10, such as shown in the above-identified patent. Said frame structure is connected to a draft hitch 11, which is connected to a hitch member 12 at its forward end. The inclined frame structure is wheel supported, one wheel 13 being shown. Said wheel is mounted on a crank axle 14 which is secured to the frame structure. The other axle 14' is broken away to show the wheel removed. Means at the upper side of the frame including a bracket 15 carries a lifting rock-shaft 16 adapted to be actuated by any suitable means by an actuating lever 17. Two lifting arms 18 and 19 connected to the lifting shaft 16 are shown, the arm 19 being considerably longer than the arm 18 for reasons to be hereinafter described.

It is to be understood that a cultivator embodying this invention would have a plurality of alternating long and short implement beams, only two of which are illustrated in the drawing. A long implement beam 20 is pivotally connected on a pivot shaft 21 carried by means on the frame 10 including a bracket 22. A substantially vertical shank or standard 23 rigidly connected to the rear end of the beam 20 carries an earth-working element in the form of a sweep 24.

A rolling disk coulter 25 is mounted for rotation on a linkage including a link 26 pivotally connected to a bracket 27 secured at a forward location to the beam 20. The linkage for supporting the coulter 25 also includes a link 28 pivotally connected to the link 26 adjacent its lower end and to the beam 20 at a rear location thereon. A plurality of openings 29 provides means for adjustably locating the coulter 25 in a plurality of vertical positions with respect to the sweep 24.

A vertical standard or shank 30 is rigidly secured to the rear of a second beam 31. Said beam is also pivoted on the shaft 21. The shank 30 carries a soil-working element or sweep 32 identical with the sweep 24.

A rolling coulter 33 is located ahead of the sweep 32 in the same relative location thereto as the location of the coulter 25 with respect to the sweep 24. A particular supporting and lifting linkage is supplied for the forward coulter to accomplish one of the principal objects of the invention, namely, to provide for lifting said coulter to substantially the same height as the sweeps. Said linkage includes a forwardly and upwardly extending link 34 which is pivotally connected at its upper end to a downwardly and rearwardly extending bracket 35 rigidly secured to the frame structure 10. The coulter 33 is rotatably mounted on the lower end of the link 34.

The lifting linkage for the forward coulter also includes a link 36, which is pivoted to the link 34 adjacent its lower end but at a point spaced from the axis of the coulter. The link 36 extends upwardly and rearwardly, being pivotally connected at its upper end to the beam 31. A plurality of openings in the upper end of said link provides means for the necessary adjustment of the coulter relative to the sweep.

For lifting the beams, a lifting link 37 is shown connected to the short lifting arm 18 and extending rearwardly and downwardly therefrom to a point of pivotal connection with the long beam 20. A second lifting link 38 pivotally connected at the end of the long lifting arm 19 extends downwardly and somewhat forwardly to a point of connection with the short beam 31.

To illustrate the operation of the lifting linkage both for the beams and for the forward coulter, a dotted line position has been indicated. In order to avoid confusion in the drawing, only such elements have been shown in dotted lines as are necessary to illustrate a lifted position. When the lifting arms 18 and 19 are moved upwardly to move the lifting links 37 and 38 to the indicated dotted line positions, the beams 20 and 31 are lifted to their indicated positions, and the sweeps 24 and 32 are lifted to the positions indicated in dotted lines. Due to the fact that the lifting arms 18 and 19 are of different lengths and the fact that the lifting links 37 and 38 are connected to the short and long beams at different distances from their pivot axis, the short beam 31 carrying the forward sweep 32 is moved through a larger angular distance than the long beam 20, which carries the sweep 24. This results in lifting the sweeps to substantially the same vertical height, giving adequate ground clearance when the sweeps are lifted to a transport position, and giving accurate depth adjustment when the sweeps are in the ground. A ground line has been indicated in the drawing on which the supporting wheel 13 is running. The full line positions of the sweeps are shown beneath the soil and the dotted lines somewhat above the ground line. These two positions indicate the principles of the vertical adjusting mechanism.

As the coulter 25 for the rear sweep is carried rigidly on the long beam 20, it will move upwardly therewith and will naturally not clear the ground to the same extent as the rear sweep. On the long beam, however, this differential is not sufficient to interfere with proper clearance for transporting or with accurate ground-working adjustment.

It would not be satisfactory to carry the forward coulter directly on the beam as its distance from the pivot shaft 21 is so short that it would not be lifted and lowered a sufficient distance with lifting and lowering of the beam 31 a normal distance. The special linkage provided takes the indicated dotted line position when the beam 31 is lifted. This action raises the coulter a substantially greater distance than would be the case if it were carried directly by the beam. The linkage and the pivot points of the links 34 and 36 are so worked out that the coulter 33 moves substantially with the sweep 32 in the vertical direction, retaining substantially the same vertical position with respect thereto.

It will be understood that in describing the coulter supporting linkages only certain links have been referred to as constituting the linkage. It is obvious that these links may be in pairs disposed on opposite sides of the coulters and the beams 20 and 31, as such constructions are well known in the art and are shown in the patent referred to as illustrating a similar type of cultivator. It is to be understood that applicant claims as his invention all modifications falling within the scope of the appended claims.

What is claimed is:

1. In a cultivator construction having a wheel-supported frame structure, an implement beam pivotally secured to said frame and extending rearwardly therefrom, a soil-working element mounted at the rear of said beam, a coulter positioned ahead of said earth-working element, lifting and supporting means for said coulter including a rearwardly and downwardly extending link pivotally secured to said frame structure, said coulter being mounted on said link, a second link pivotally secured to said link adjacent the lower end and to the beam at a point rearwardly of the coulter, and lifting means for said beam, the lifting means for the coulter being such as to lift the said couter to substantially the same vertical height as the earth-working element.

2. In a cultivator construction having a wheel-supported frame, an implement beam pivotally secured to said frame and extending rearwardly therefrom, a soil-working element mounted at the rear of said beam, a coulter positioned ahead of said earth-working element, lifting and supporting means for said coulter including a depending bracket secured to the frame, a rearwardly and downwardly extending link pivotally secured to said bracket, said coulter being mounted on said link, a second link pivotally secured to said link adjacent the lower end and to the beam at a point rearwardly of the coulter, and lifting means for said beam, the lifting means for the coulter being such as to lift the said coulter to substantially the same vertical height as the earth-working element.

3. In a cultivator construction having a wheel-supported frame, an implement beam pivotally secured to said frame and extending rearwardly therefrom, a soil-working element mounted at the rear of said beam, a rolling disk coulter positioned ahead of said earth-working element, means for mounting said coulter including a depending bracket secured to the frame, a rearwardly and downwardly extending link pivotally secured to said bracket at a point spaced from the beam pivot, said coulter being rotatably mounted at the lower end of said link, a second link pivotally secured to said link adjacent the lower end and to the beam at a point rearwardly of the coulter, and lifting means for said beam, the lifting means for the coulter being such as to lift the said coulter to substantially the same vertical height as the earth-working element.

4. In a cultivator construction having a wheel-supported frame, an implement beam pivotally secured to said frame and extending rearwardly therefrom, a soil-working element mounted at the rear of said beam, a coulter positioned ahead of said earth-working element, means for mounting and lifting said coulter including a depending bracket secured to the frame, a rearwardly and downwardly extending link pivotally secured to said bracket at a point rearwardly of the beam pivot, an upwardly and rearwardly extending link pivotally secured to said link adjacent the lower end and to the beam, and lifting means for said beam, the lifting means for the coulter being such as to lift the said coulter to substantially the same vertical height as the earth-working element.

5. In a field cultivator construction having a wheel-supported structure, a plurality of implement beams pivotally secured to said frame and extending rearwardly therefrom, one of said beams being substantially longer than another one, a soil-working element mounted at the rear of the longer beam, a coulter mounted on said beam ahead of the earth-working element, a soil-working element mounted at the rear of the short beam at a substantial distance ahead of the element on the long beam, a second coulter positioned ahead of said second earth-working element, a supporting and lifting linkage for said coulter including a rearwardly and downwardly extending link pivotally secured to said frame structure at a point rearwardly of the pivot point of the short beam, said second coulter being mounted at the lower end of said link, a second link pivotally secured to said link adjacent the lower end and to the short beam at a point rearwardly of the coulter and lifting means for said beams, the lifting linkage for the second coulter being such as to lift said coulter to substantially the same vertical height as the front earth-working element.

6. In a field cultivator construction having a wheel-supported frame structure, a plurality of implement beams pivotally secured to said frame and extending rearwardly therefrom, one of said beams being substantially longer than another one, a soil-working element mounted at the rear of the longer beam, a coulter mounted on said beam ahead of the earth-working element, a soil-working element mounted at the rear of the short beam at a substantial distance ahead of the element on the long beam, a second coulter positioned ahead of said second earth-working element, supporting and lifting linkage for said coulter including a rearwardly and downwardly extending link pivoted to said frame structure at a point spaced from the pivot of said beams, said second coulter being mounted at the lower end of said link, a second link pivotally secured to said link adjacent the lower end and to the short beam at a point rearwardly of the coulter, and means for differentially lifting said beams whereby the short beam will be lifted substantially the same vertical distance as the long beam, the lifting linkage for the second coulter being such as to lift said coulter to substantially the same vertical height as the front earth-working element.

7. In a field cultivator construction having a wheel-supported frame structure, a plurality of implement beams pivotally secured to said frame and extending rearwardly therefrom, one of said beams being substantially longer than another one, a soil-working element mounted at the rear of the longer beam, a coulter mounted on said beam ahead of the earth-working element, a soil-working element mounted at the rear of the short beam at a substantial distance ahead of the element on the long beam, a second coulter positioned ahead of said second earth-working element, means for supporting and lifting said coulter including a rearwardly and downwardly extending link secured to said frame structure, said second coulter being mounted at the lower end of said link, an upwardly and rearwardly extending link pivotally secured to said link adjacent the lower end and to the short beam at a point rearwardly of the coulter, and lifting means for said beams including a transverse rock-shaft on the frame structure, two rearwardly extending lifting arms, one being substantially longer than the other, a lifting link connected to the short arm and extending downwardly and rearwardly to a point of connection with the long beam, and a second lifting link connected to the long arm and extending forwardly and downwardly to a point of connection with the short beam, said lifting linkage providing means whereby the short beam is lifted a larger angle than the long beam to raise the earth-working elements to substantially the same vertical height and the lifting linkage for the second coulter being such as to lift the said coulter to substantially the same vertical height as the front earth-working element.

ARTHUR A. SCARLETT.